United States Patent [19]

Takano et al.

[11] Patent Number: 4,861,006
[45] Date of Patent: Aug. 29, 1989

[54] ANTI-VIBRATION APPARATUS

[75] Inventors: Kazuya Takano, Kamakura; Takeshi Noguchi, Yokohama, both of Japan

[73] Assignee: Bridgestone Corporation, Tokyo, Japan

[21] Appl. No.: 96,028

[22] Filed: Sep. 11, 1987

[30] Foreign Application Priority Data

Sep. 16, 1986 [JP] Japan ................. 61-217645
Dec. 22, 1986 [JP] Japan ................. 61-306099

[51] Int. Cl.⁴ ............................. F16F 6/00
[52] U.S. Cl. .................. 267/140.1; 188/267; 188/322.5
[58] Field of Search ............... 248/550, 562; 267/217, 267/225, 226, 121, 140.1; 188/267, 322.5

[56] References Cited

U.S. PATENT DOCUMENTS

| | | |
|---|---|---|
| 1,114,284 | 10/1914 | Olsen . |
| 1,800,434 | 4/1931 | Christman . |
| 2,502,322 | 3/1950 | Iredell, Jr. . |
| 2,539,443 | 1/1951 | Lee . |
| 2,540,130 | 2/1951 | Lee . |
| 2,582,998 | 1/1952 | Lee . |
| 2,886,151 | 5/1959 | Winslow . |
| 3,047,507 | 7/1962 | Winslow . |
| 3,159,388 | 12/1964 | Wall . |
| 3,361,216 | 1/1968 | Walker . |
| 4,288,063 | 9/1981 | Brenner et al. . |
| 4,383,679 | 5/1983 | Kakimoto . |
| 4,399,987 | 8/1983 | Cucelli et al. ............... 267/140.1 |
| 4,424,960 | 1/1984 | Dan et al. . |
| 4,460,168 | 7/1984 | Obadal ......................... 267/140.1 |
| 4,505,462 | 3/1985 | Dan et al. ..................... 267/140.2 |
| 4,511,126 | 4/1985 | Bernuchon et al. ........... 267/140.1 |
| 4,535,976 | 8/1985 | Dan et al. . |
| 4,568,069 | 2/1986 | Poupard ........................ 267/140.1 |
| 4,583,723 | 4/1986 | Ozawa .......................... 267/140.1 |
| 4,595,183 | 6/1986 | Dan et al. .................... 267/140.1 |
| 4,610,421 | 9/1986 | Ohta et al. ................... 248/550 |
| 4,630,806 | 12/1986 | Dan et al. .................... 267/140.1 |
| 4,630,808 | 12/1986 | Ushijima et al. ............ 267/140.1 |
| 4,635,910 | 1/1987 | Ozawa et al. ................ 267/140.1 |
| 4,650,170 | 3/1987 | Fukushima ................... 267/140.1 |
| 4,660,812 | 4/1987 | Dan et al. .................... 267/140.1 |
| 4,664,363 | 5/1987 | Gold et al. ................... 267/140.1 |
| 4,687,188 | 8/1987 | Knurek et al. ............... 267/140.1 |
| 4,706,947 | 11/1987 | Makibayashi et al. ....... 267/140.1 |
| 4,720,087 | 1/1988 | Duclos et al. ................ 267/140.1 |

FOREIGN PATENT DOCUMENTS

| | | |
|---|---|---|
| 0027751 | 4/1981 | European Pat. Off. . |
| 0040290 | 11/1981 | European Pat. Off. . |
| 0088682 | 9/1983 | European Pat. Off. . |
| 0133588 | 2/1985 | European Pat. Off. . |
| 0147242 | 7/1985 | European Pat. Off. . |
| 0209145 | 1/1987 | European Pat. Off. ........ 267/140.1 |
| 3210731 | 10/1983 | Fed. Rep. of Germany . |
| 3340153 | 8/1984 | Fed. Rep. of Germany . |
| 3519016 | 12/1986 | Fed. Rep. of Germany . |
| 52-131072 | 11/1977 | Japan . |
| 53-117704 | 10/1978 | Japan . |
| 56-66539 | 6/1981 | Japan . |
| 57-76340 | 5/1982 | Japan . |
| 129944 | 8/1982 | Japan ............................. 267/140.1 |
| 57-184344 | 11/1982 | Japan . |
| 58-37337 | 3/1983 | Japan . |
| 58-203242 | 11/1983 | Japan . |
| 59-47541 | 3/1984 | Japan . |
| 59-65635 | 4/1984 | Japan . |

(List continued on next page.)

Primary Examiner—Duane A. Reger
Attorney, Agent, or Firm—Oliff & Berridge

[57] ABSTRACT

An anti-vibration apparatus includes an expandable liquid chamber, an electrorheologic fluid contained in the liquid chamber, a partition wall for separating the liquid chamber into a plurality of small liquid chambers, and an orifice communicating the small liquid chambers. The orifice comprises an elongated orifice, within which electrodes are disposed to pass a current through the electrorheologic fluid. Therefore, the viscosity of the electrorheologic fluid contained in the orifice can be changed, so as to adjust the resistance to the flow through the orifice of the fluid.

20 Claims, 10 Drawing Sheets

FOREIGN PATENT DOCUMENTS

| | | |
|---|---|---|
| 59-97334 | 6/1984 | Japan . |
| 60-104828 | 6/1985 | Japan . |
| 113835 | 6/1985 | Japan . |
| 60-179542 | 9/1985 | Japan . |
| 0201136 | 10/1985 | Japan . |
| 61-2936 | 1/1986 | Japan . |
| 61-55427 | 3/1986 | Japan . |
| 61-59034 | 3/1986 | Japan . |
| 61-74930 | 4/1986 | Japan . |
| 61-130639 | 6/1986 | Japan . |
| 62-31738 | 2/1987 | Japan . |
| 62-46041 | 2/1987 | Japan . |
| 0578510 | 10/1977 | U.S.S.R. . |
| 756107 | 8/1956 | United Kingdom ............ 267/140.1 |
| 2041485 | 9/1980 | United Kingdom . |
| 2132312 | 7/1984 | United Kingdom . |

ANTI-VIBRATION APPARATUS

BACKGROUND OF THE INVENTION

The present invention relates to an anti-vibration apparatus to be interposed between a vibration generating section and a vibration receiving section, and, more particularly, to an anti-vibration apparatus of the type which contains liquid and which absorbs vibrations by virtue of the resistance against flow of the liquid.

Known anti-vibration apparatuses to be employed in engine mountings, cabin mountings, or body mountings of vehicles include one which has a liquid chamber partly formed of an elastic body. The liquid chamber is generally divided by partition walls into a plurality of small liquid chambers, and the small liquid chambers communicate with each other through orifices.

When vibrations are generated, the liquid contained in one of the small liquid chambers moves toward the other small liquid chambers through the orifices, and the energy of the vibrations is absorbed by virtue of the resistance to the passage through the orifices of the liquid.

In such an anti-vibration apparatus, in order to cope with the vibrations of different frequencies which are generated in a vehicle, a plurality of orifices having different apertures must be provided in such a manner that they are opened and closed separately by a means such as valves.

An anti-vibration apparatus of a type which is capable of changing the velocity of the fluid contained therein in response to a load applied thereto, by applying an electric field thereto (such as that disclosed in the specifications of Japanese Patent Laid-Open Nos. 104828/1985 and 74930/1986), has also been known. However, the orifices in this apparatus are short, and sufficient damping is not guaranteed.

SUMMARY OF THE INVENTION

In view of the above-described disadvantages, an object of the present invention is to provide an anti-vibration apparatus which is readily capable of absorbing vibrations of different frequencies.

To this end, the present invention provides an anti-vibration apparatus which comprises an expandable liquid chamber interposed between a vibration generating section and a vibration receiving section, a partitioning portion for partitioning the liquid chamber into a plurality of small liquid chambers, an elongated orifice communicating the small liquid chambers, an electrorheologic fluid contained in the liquid chamber, and electrode means provided within the elongated orifice, wherein the passing of a current through the electrode means varies the viscosity of the electrorheologic fluid contained in the elongated orifice.

An electrorheologic fluid is a fluid whose viscosity increases as the intensity of an electric field applied thereto increases, and has been disclosed in, for example, U.S. Pat. Nos. 2,886,151 and 3,047,507.

This invention is designed to vary the viscosity of the electrorheologic fluid contained in the orifice by passing a current through the electrode means, so as to adjust the rheologic resistance of the fluid. This enables vibrations of different frequencies over a wide frequency range to be dealt with.

DESCRIPTION OF THE PREFERRED EMBODIMENTS

Figure 1:
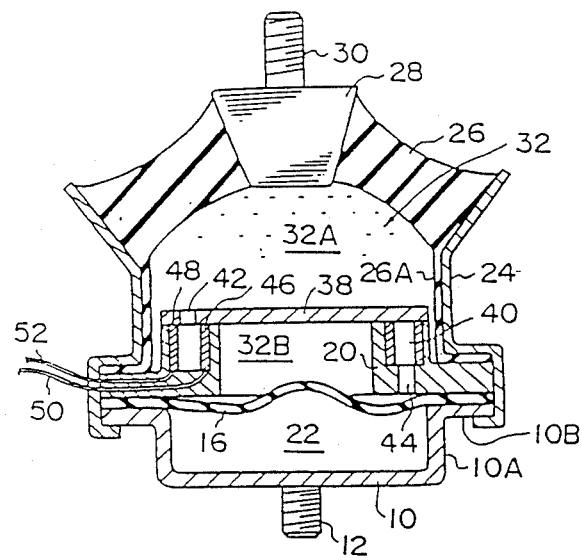
FIG. 1 is a vertical sectional view of an anti-vibration apparatus, showing a first embodiment of the present invention.

FIG. 1 shows an anti-vibration apparatus, showing a first embodiment of the present invention. A base plate 10 of the anti-vibration apparatus is provided with a bolt 12 which projects from a central portion of the bottom thereof, and by which the apparatus is fixed to, for example, the body of a vehicle.

The periphery of the base plate 10 is provided with a a tubular-shaped vertical wall portion 10A which is bent upward from the base plate 10. The upper edge of the vertical wall portion 10A is provided with a flange portion 10B which is bent outwardly from the vertical wall portion 10A in such a manner that it forms a right angle. A diaphragm 16 and a partition wall 20 constituting a partitioning portion are placed on the flange portion 10B. An air chamber 22 is formed between the diaphragm 16 and the base plate 10. It may communicate with the air outside the apparatus, if desired.

The peripheries of the partition wall 20 and the diaphragm 16 are caulked to the flange portion 10B by a lower end portion of an outer tube 24. The inner diameter of the upper end portion of the outer tube 24 is gradually increased, and the outer surface of a vulcanized vibration absorbing main body 26 is bonded thereto. The vibration absorbing main body 26 is, for example, made of rubber. The lower end portion of the vibration absorbing main body 26 forms an extended portion 26A which extends along the inner surface of the outer tube 24, and part of the extended portion 26A is clamped between the outer tube 24 and the partition wall 20.

The outer surface of a support 28 is bonded to the axial center of the vulcanized vibration absorbing main body 26. A bolt 30 projects from the center of the support 28 and is used to fix an engine (not shown) to the support 28.

The vibration absorbing main body 26, the outer tube 24, and the diaphragm 16 together define a liquid chamber 32 in which an electrorheologic fluid (not shown) is charged. The electrorheologic fluid may be a mixture consisting of 40 to 60 wt % of silicic acid, 30 to 50 wt % of a low-boiling-point organic phase, 50 to 10 wt % of water, and 5 wt % of a dispersion medium, or, isododekan. The electrorheologic fluid has characteristics such that the viscosity thereof remains the same while no current is passed therethrough, but increases until the fluid becomes solidified as the intensity of an electric field applied thereto increases.

Figure 2:
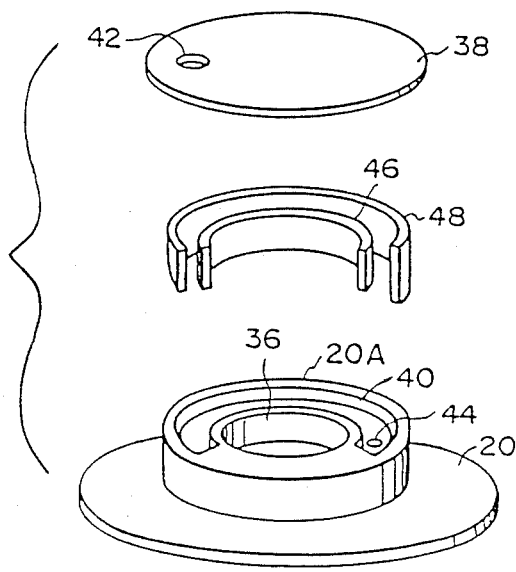
FIG. 2 is an exploded perspective view of a partition wall of the apparatus of FIG. 1.

Turning to FIG. 2, the central portion of the partition wall 20 has an elevated portion 20A with a through-hole 36 formed therein. The through-hole 36 is closed by heat welding or high-frequency welding a partition lid plate 38 to the elevated portion 20A. The partition wall 20 and the partition lid plate 38 thereby divide the liquid chamber 32 into an upper small liquid chamber 32A and a lower small liquid chamber 32B.

The elevated portion 20A is provided with a groove having a substantially C-shaped plan view, the open end thereof being closed by the partition lid plate 38 so as to form an extended orifice 40. Two longitudinal ends of the orifice 40 communicate with the upper small liquid chamber 32A and the lower small liquid chamber 32B through a round hole 42 formed through the partition lid plate 38 and a round hole 44 formed through the partition wall 20, respectively.

This structure allows the liquid contained in the upper small liquid chamber 32A and the lower small liquid chamber 32B to circulate through the orifice 40, generating resistance as the liquid passes through the orifice 40.

Electrode plates 46 and 48 are coaxially bonded onto the opposite surfaces, i.e., the side walls, of the inner surface of the orifice 40. The electrode plates 46 and 48 are connected to a power source and a control circuit (not shown) by leads 50 and 52 through the partition wall 20, and can be made to pass a current, if necessary.

Part or all of the partition wall 20 sealing the leads 50 and 52 must be made of an electrically insulating material such as a synthetic resin or ceramic. The electrode plates 46 and 48 are separated from each other by, for example, about 1 to 2 mm.

The function of the first embodiment of the present invention will now be described. The base plate 10 is mounted on the vehicle (not shown) by the bolt 12, and the support 28 is fixed to the engine by the bolt 30.

The vibrations generated by the engine are transferred through the support 28 to the vibration absorbing main body 26, where they are absorbed by virtue of the inner friction of the vibration absorbing main body 26.

These vibrations are also transferred through the vibration absorbing main body 26 to the liquid chamber 32 to make the electrorheologic fluid contained in the liquid chamber 32 move through the orifice 40, causing resistance against the flow of the fluid through the orifice 40 which absorbs the vibrations.

The vibrations generated by an engine cover a wide frequency range. Accordingly, a current is passed through the electrode plates 46 and 48 via the leads 50 and 52 in response to the frequency of the vibrations generated, so that the viscosity of the fluid within the orifice 40 can be gradually increased. In consequence, vibrations over a wide frequency range can be absorbed, if the amount of current supplied is controlled in accordance with the frequency of the vibrations to be absorbed.

The orifice 40 has a long axis, which enables a wide range of generated engine vibrations to be absorbed.

In practice, when the anti-vibration apparatus of this embodiment is employed in an engine mounting, bouncing vibrations having a frequency of 15 Hz and rolling vibrations having a frequency of about 7 Hz are generated by the engine. To cope with the vibrations at these different frequencies, the viscosity of the fluid of this anti-vibration apparatus is tuned to a value at which the fluid can deal with the bouncing vibrations when no current is being passed through the electrode plates 46 and 48. When rolling vibrations are generated, a potential difference is applied between the electrode plates 46 and 48 by passing a current through them, so that the viscosity of the fluid is increased and the high damping peak position can be shifted to the vicinity of 7 Hz.

Figure 3:
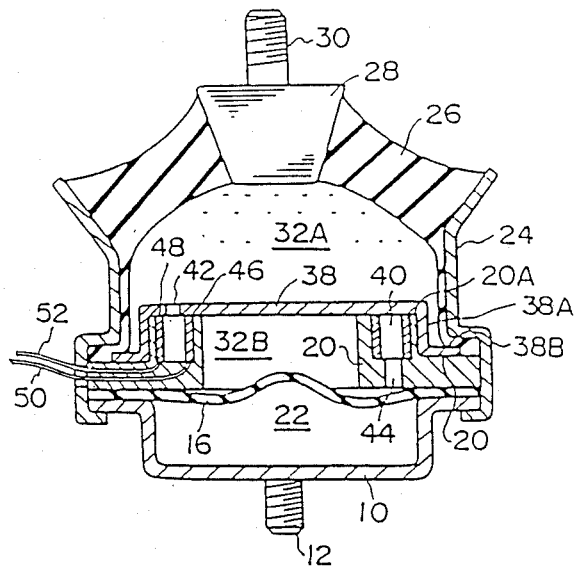
FIG. 3 is a vertical sectional view of the apparatus, showing a second embodiment of the present invention.

FIG. 3 shows a second embodiment of the present invention. In this embodiment, the periphery of the partition lid plate 38 is provided with a tubular vertical wall portion 38A which is bent from the partition lid plate 38 in such a manner that it forms a right angle. The vertical wall portion 38A is in contact with the outer surface of the elevated portion 20A. The lower end portion of the vertical wall portion 38A is provided with a flange portion 38B which is bent from the vertical wall portion 38A in such a manner that it forms a right angle. The flange portion 38B is in close contact with the upper surface of the partition wall 20, and is pressed against the partition wall 20 by being caulked by the lower end portion of the outer tube 24. These arrangements provide an accurate sealing between the upper surface of the partition wall 20 and the partition lid plate 38, thereby forming the orifice 40 which does not leak at all.

Figure 4A:
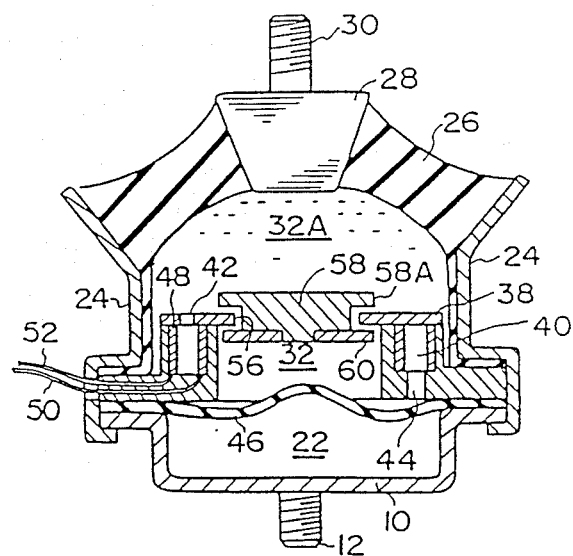
FIGS. 4 (A) and (B) are vertical sectional views of the apparatus, showing third and fourth embodiments of the present invention.

FIG. 4(A) shows a third embodiment of the present invention. In this embodiment, the central portion of the partition lid plate 38 is provided with an opening 56, and a movable plate 58 is mounted within the opening 56. The end of the movable plate 58 which is located in the upper small liquid chamber 32A is provided with a larger diameter portion 58A. A stopper plate 60 is fixed to the end of the movable plate 58 which is located in the lower small liquid chamber 32B. The outer diameter of the larger diameter portion 58A of the movable plate 58 or the stopper plate 60 is made to be larger than that of the opening 56, and both of the movable plate 58 and the stopper late 60 together have a thickness which is larger than that of the partition lid plate 38. These arrangements allow the movable plate 58 to be displaced (vibrated) minutely (about 0.5 mm or less) perpendicular to the partition lid plate 38.

In this embodiment, vibrations of a wide range of frequencies can be absorbed by utilizing variations in the viscosity of the electrorheologic fluid which is generated by passing a current through the electrode plates 46 and 48. Further, since the movable plate 58 is capable of being vibrated minutely, when minute vibrations of a high frequency are received, the dynamic spring constant can remain low, and the muffled noise can thereby be reduced.

Figure 4B:
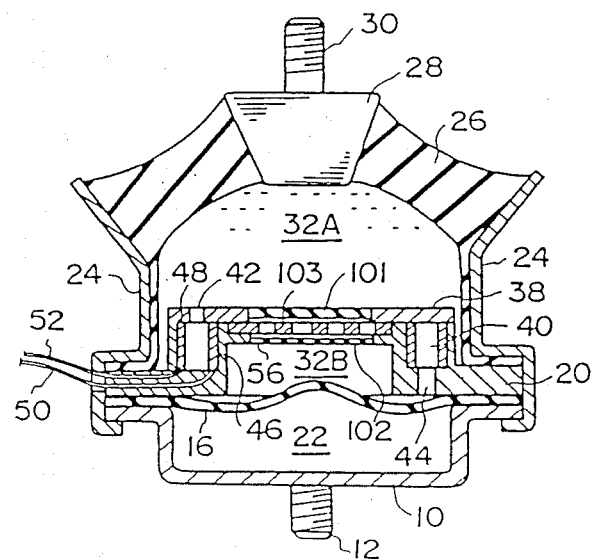

FIG. 4(B) shows a fourth embodiment of the present invention. The anti-vibration apparatus in this embodiment also includes a minutely displaceable member as in the third embodiment. A minutely displaceable iron plate 103 has a plurality of through-holes, and is interposed between elastic membranes 101 and 102. The peripheries of the vulcanized elastic membranes 101 and 102 are bonded to the partition lid plate 38 and the partition wall 20, respectively. They are disposed in such a manner that gaps are provided between the elastic membrane 101 and the iron plate 103 and the iron plate 103 and the elastic membrane 102, so that the iron plate 103 can be displaced minutely in the gaps. Other arrangements of the fourth embodiment are the same as those of the third embodiment shown in FIG. 4(A), and the same effect is ensured.

Figure 5:
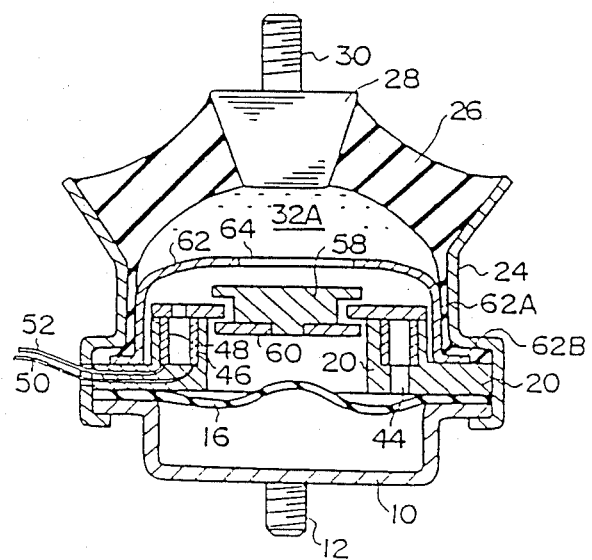
FIGS. 5 and 6 are vertical sectional views of the apparatus, showing fifth and sixth embodiments of the present invention.

FIG. 5 shows a fifth embodiment of the present invention. The anti-vibration apparatus in this embodiment includes, in addition to the components included in the third embodiment, a separating plate 62 within the upper small liquid chamber 32A. The separating plate 62 is located substantially at the center of the upper small liquid chamber 32A, and the periphery thereof is provided with a vertical wall portion 62A which is bent from the separating plate 62 in such a manner that it substantially forms a right angle. The lower end portion of the vertical wall portion 62A is provided with a flange portion 62B which is bent from the vertical wall portion 62A in such a manner as to form a right angle. The flange portion 62B is pressed against the partition wall 20 by the lower end portion of the outer tube 24. The central portion of the separating plate 62 has an opening 64.

Thus, the separating plate 62 separates the upper small liquid chamber 32A into two parts which are made to communicate with each other through the opening 64.

As a result, in this embodiment, in addition to the effects ensured by the apparatus of the third embodiment, the liquid column resonance which is generated in the vicinity of the opening 64 can be made use of to reduce the dynamic spring constant further with respect to the vibrations of a particular frequency.

Figure 6:
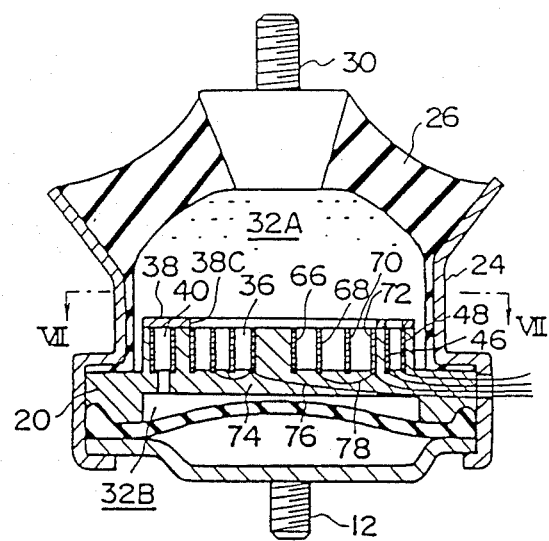
Figure 7:
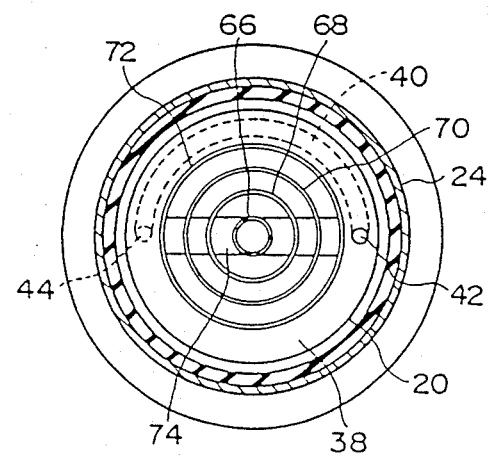
FIG. 7 is a section taken along the line VII—VII of FIG. 6.

FIG. 6 shows a sixth embodiment of the present invention. The anti-vibration apparatus in this embodiment includes, in addition to the components included in the first embodiment, a plurality of (four in this embodiment) coaxial electrode plates 66, 68, 70, and 72 located within the through-hole 36. The electrode plates 66, 68, 70, and 72 are supported in the through-hole on an arm 74 which extends across the through-hole 36. Leads 74 and 76, which pass within the arm 74 and the partition wall 20, respectively connect the electrode plates 66 and 70 and the electrode plates 68 and 72 to a control device and a power source (neither being shown).

The partition lid plate 38 is provided with a through-hole 38C which communicates with the through-hole 36, so that the through-holes 38C and 36 together communicate the upper small liquid chamber 32A with the lower small liquid chamber 32B.

The electrode plates 66 to 72 are separated from each other by a spacing which is almost the same as that between the electrode plates 46 and 48.

In this embodiment, the orifice which communicates the upper and lower small liquid chambers 32A and 32B through the through-holes 36 and 38C therefore has a cross-sectional area Sa which is larger than that Sb of the orifice 40, and a length which is shorter than that of the orifice 40.

A combination of the orifice 40 and the orifice formed by the through-holes 36 and 38C containing a fluid whose viscosity can be changed by passing a current through the electrode plates 46, 48, 66, 68, 70, and 72 enables absorption of vibrations having a variety of frequencies. To reduce the muffled noise which is generated when the vehicle is running at high speed, it is preferable that the orifice formed by the through-holes 38C and 36 is adjusted such that the fluid can flow freely therethrough. The fluid contained within the through-holes 38C and 36 may also be solidified, so that the upper and lower small liquid chambers 32A and 32B can communicate with each other substantially through the orifice 40 alone. In this case, if no current is passed through the electrode plates 46 and 48, the orifice 40 acts in the same way as an orifice which is not equipped with any electrode plates 46 and 48.

In practice, bouncing vibrations having a frequency of 15 Hz and pitching vibrations having a frequency of about 7 Hz are generated. However, it is in general impossible to provide high levels of damping with respect to vibrations of different frequencies. To cope with the vibrations of different frequencies, the diameter and length of the orifice 40 are determined so that the high damping frequency peak is tuned at 15 Hz when no potential difference is being applied to the electrode plates 46 and 48. When pitching vibrations are generated, an electric field is applied between the electrode plates 46 and 48 to increase the viscosity of the fluid to such an extent that the high damping frequency peak moves to the vicinity of 7 Hz. At this point, the fluid contained within the orifice incorporating the electrode plates 66 to 72 is solidified by the potential difference applied therebetween.

Further, if the fluid contained within the orifice 40 is solidified, the spring constant can be made extremely high. This effect is used when a high load is applied to the engine and the engine must be separated from other parts, to ensure that the engine does not interfere with the other parts.

In this embodiment, the ratio L/S of the length L of each of the orifices to the cross-sectional area S thereof is preferably set to 2 or above.

Figure 8:
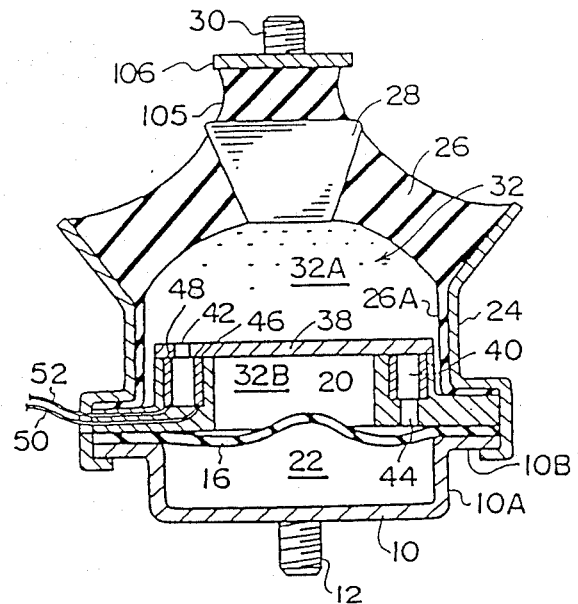
FIG. 8 is a vertical sectional view of the apparatus, showing a seventh embodiment of the present invention.

FIG. 8 shows a seventh embodiment of the present invention. The anti-vibration apparatus in this embodiment includes an elastic member 105 mounted on the support 28. The vulcanized elastic member 105 is bonded to a plate 106 on which the bolt 30 is fixed. This enables the spring constant to remain reduced when the fluid does not flow through the orifice and the pressure in the upper small liquid chamber 32A is thereby raised.

Figure 9:
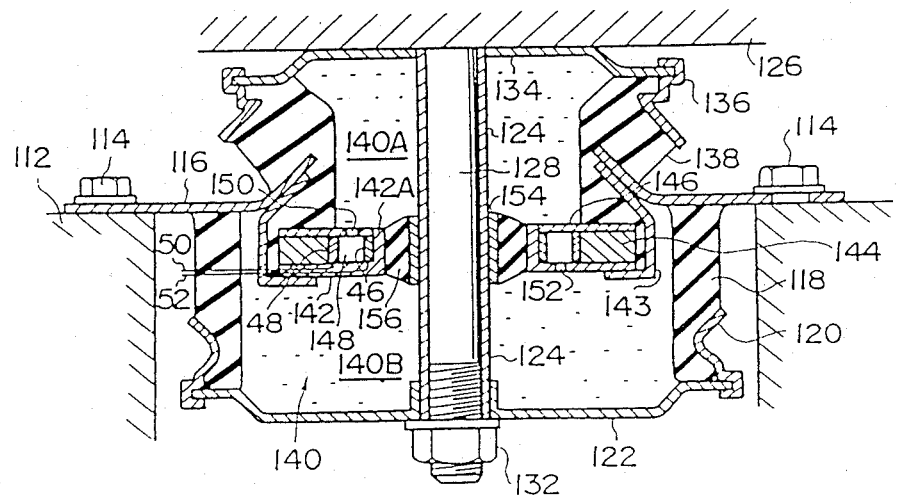
FIG. 9 is a vertical sectional view of the apparatus, showing an eighth embodiment of the present invention.

FIG. 9 shows an eighth embodiment of the present invention, in which the anti-vibration apparatus is employed in the cabin mounting of a vehicle. The anti-vibration apparatus includes a base plate 116 fixed to a car body 112 by bolts 114, and a tubular lower vibration absorbing main body 118 made of a material such as a rubber. The upper end of the vulcanized lower vibration absorbing main body 118 is bonded to the base plate 116.

The inner surface of a short metal tube 120 is bonded to the outer surface of the lower end portion of the vulcanized lower vibration absorbing main body 118. The lower surface of the lower vibration absorbing main body 118 is supported by a base plate 122 which is caulked to the short tube 120. The lower end portion of an inner tube 124 passes through the center of the base plate 122 and is fixed thereto. A bolt 128, which hangs from a cabin 126 which constitutes a vibration generation section, is inserted into the inner tube 124, with the distal end thereof being tightened by a nut 132.

A flat plate 134 is fixed to the upper end of the inner tube 124, and a short tube 136 is caulked to the periphery of the flat plate 134. The upper and lower ends of an upper vibration absorbing main body 138 which is a vulcanized rubber formed into a tubular-shape are bonded to the short tube 136 and the base plate 116, respectively.

The flat plate 134, the vibration absorbing main bodies 118 and 138, and the base plate 122 together define a liquid chamber 140, and an electrorheologic fluid is charged therein, as in the liquid chamber 32 in any of the previous embodiments.

A partition wall 142 is disposed within the liquid chamber 140 so as to divide the liquid chamber 140 into an upper small liquid chamber 140A and a lower small liquid chamber 140B. The partition wall 142 is placed on a short tube 143 which has an upper end portion fixed to the base plate 116, and the periphery thereof is pressed against the short tube 143 with the extended lower portion of the upper vibration absorbing main body 138 being interposed therebetween. A spacer 144 and a partition lid plate 146 are mounted on the partition wall 142, so that the spacer 144 and the partition lid plate 146, together with a tubular portion 142A of the partition wall 142, define an orifice 148. The orifice 148 has the same configuration as that of the orifice 40 in any of the previous embodiments, and is made to communicate with the upper and lower liquid chambers 140A and 140B through a round through-hole 150 provided in the partition lid plate 146 and a round through-hole 152 formed in the partition wall 142.

The inner tube 124 passes on the inner side of the tubular portion 142A of the partition wall 142. A tubular-shaped, vulcanized rubber 156 is bonded between the tubular portion 142A and the inner surface of a ring 154 which is slidably mounted on the outer surface of the inner tube 124.

The electrode plates 46 and 48 are mounted on the outer surface of the tubular portion 142A and the inner surface of the spacer 144, respectively, within the orifice 148 in such a manner that they face each other, so that the viscosity of the electrorheologic fluid contained in the orifice 148 can be varied by passing a current through the electrode plates 46 via the leads 50 and 52.

Thus, the anti-vibration apparatus in this embodiment is capable of varying its vibration absorption characteristics by changing the viscosity of the liquid contained in the orifice 148 when the vibrations are generated by the cabin 126.

Further, in this embodiment, the vibrations of the cabin 126 are transferred to the base plate 122 through the bolt 128. This enables the lower small liquid chamber 140B to be expanded while the upper small liquid chamber 140A is being contracted, increasing the flow rate within the orifice 148.

Figure 10:
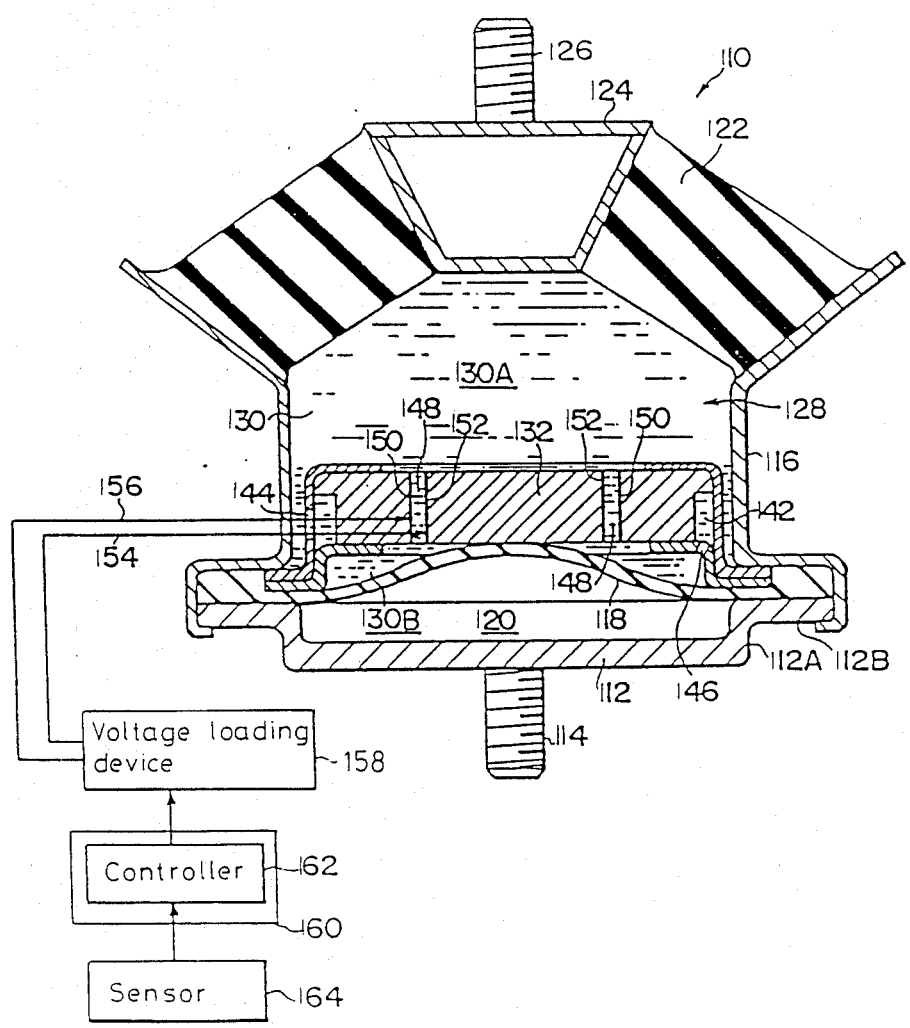
FIG. 10 is a vertical sectional view of the apparatus, showing a ninth embodiment of the present invention.
Figure 11:
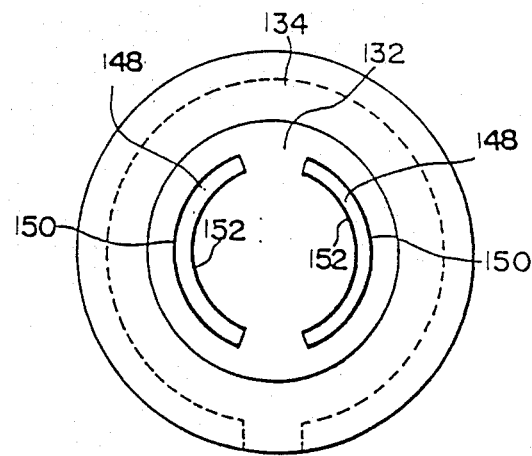
FIG. 11 is a plan view of the partition wall of the ninth embodiment.

FIGS. 10 and 11 show a ninth embodiment of the present invention.

An anti-vibration apparatus 110 is designed to be fixed to the car body of a vehicle through a bolt 114 hanging from the center of a base plate 112 of the apparatus.

The periphery of the base plate 112 is provided with a vertical wall portion 112A which is bent from the base plate 112 in such a manner as to form a right angle. The upper end portion of the vertical wall portion 112A is provided with a flange portion 112B which is bent from the vertical wall portion 112A in such a manner as to form a right angle and which is extended in the radial direction.

The lower end portion of an outer tube 116 is caulked to the periphery of the flange portion 112B with the periphery of a diaphragm 118 interposed therebetween. An air chamber 120 is formed between the diaphragm 118 and the base plate 112. It may communicate with the air outside the apparatus, if necessary.

The diameter of the upper end portion of the outer tube 116 is gradually increased, and the outer surface of a vulcanized elastic body 122 which is formed substantially into a tubular shape is bonded on the inner surface of the larger diameter portion. The elastic body 122 is formed into a ring-shape whose diameter is gradually decreased toward its upper end, and the outer surface of a frame body 124 is bonded on the inner surface of the vulcanized elastic body 122. A bolt 126 is provided at the center of the frame body 124, by which the engine (not shown) of a vehicle can be fixed on the frame body 124.

The elastic body 122, the outer tube 116, and the diaphragm 118 together define a liquid chamber 128, and a liquid 130 which comprises an electrorheologic fluid is charged in the liquid chamber 128. The electrorheologic fluid has characteristics such that the viscosity thereof remains the same while no current is passed therethrough via electrodes 150 and 152, but increases until the fluid becomes solidified as the intensity of an electric field applied thereto increases.

A partition wall 132 is disposed within the liquid chamber 128 so as to separate the chamber into an upper small liquid chamber 130A and a lower small liquid chamber 130B.

Figure 12:
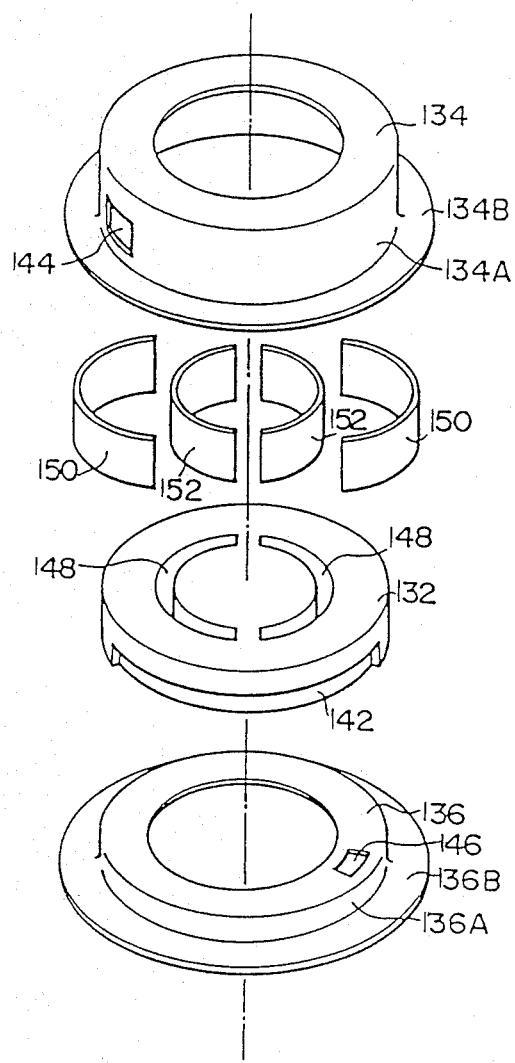
FIG. 12 is an exploded perspective view of the partition wall of the ninth embodiment.

As shown in FIG. 12, the upper and lower surfaces of the partition wall 132 are clamped by an upper support plate 134 and a lower support plate 136, respectively.

The peripheries of the upper and lower support plates 134 and 136 are provided with tubular portions 134A and 136A, respectively. The lower end portions of the tubular portions 134A and 136A are provided with flange portions 134B and 136B which are bent from the tubular portions 134A and 136A in such a manner that they form right angles and which project in the radial direction. The flange portions 134B and 136B are in close contact with each other, and are clamped, together with the diaphragm 118, between the outer tube 116 and the base plate 112.

The outer surface of the partition wall 132 is in close contact with the tubular portion 134A, so that a recess which is formed half around the circumference of the partition wall 132 forms a first passageway 142. One longitudinal end of the first passageway 142 communicates with the upper small liquid chamber 130A through a through-hole formed in the tubular portion 134A, and the other end thereof communicates with the lower small liquid chamber 130B through a through-hole 146 formed in the lower support plate 136. The first passageway 142 thus acts as an orifice which communicates the upper and lower small liquid chambers 130A and 130B.

A pair of second passageways 148 each of which has a semi-circular form are provided in the partition wall 132 in such a manner that they pass therethrough in the vertical direction.

Each of the second passageways 148 incorporates a pair of electrodes 150 and 152 which are connected via leads 154 and 156 to a voltage loading device 158 which constitutes a drive circuit and a control device 160. The control device 160 includes a controller 162 which is adapted to select the most suitable frequency and voltage value, using the rotational speed of the engine of the vehicle, the running speed of the vehicle, and the acceleration which are detected by a sensor 164, and supply them to the electrodes 150 and 152.

The total cross-sectional area of the pair of second passageways 148 which passes the fluid is larger than that of the first passageway 142.

The function of the anti-vibration apparatus in this embodiment will now be described.

The anti-vibration apparatus 110 is fixed to the car body of the vehicle by the bolt 114, and is mounted with respect to the engine in such a manner that the frame body 124 is fixed to the engine by the bolt 126.

If the vibrations generated by the engine are limited to those of a relatively low frequency, they are absorbed by virtue of the resistance to flow through the first passageway 142 of the liquid 130 contained in the liquid chamber 128.

In this case, a current is passed through the electrodes 150 and 152 from the control device 160 to solidify the liquid contained in the second passageways 148 and thereby substantially close them.

When the engine generates vibrations which have a high frequency, the first passageway 142 becomes substantially blocked by the liquid 130 contained therein, so no vibrations are absorbed within the first passageway 142. However, the current applied to the electrodes 150 and 152 is stopped so that the liquid 130 moves through the second passageways 148 to the lower small liquid chamber 130B, and the vibrations can be absorbed therein without increasing the pressure in the upper small liquid chamber 130A.

If the vibrations generated by the engine are composite vibrations which consist of low frequency vibrations and high frequency vibrations, the control device 160 applies a voltage to the electrodes 150 and 152 at a frequency which is the average of the frequencies of the low frequency vibrations and the high frequency vibrations.

In consequence, the vibrations which have a lower frequency than that of the voltage frequency cannot pass through the second passageways 148, but the vibrations which have a higher frequency can pass therethrough, thereby deforming the diaphragm 118. This results in the absorption of vibrations within the second passageways 148 and in the other small liquid chamber.

FIG. 13 shows different types of alternating voltage supplied from the control device 60.

Figure 13A:
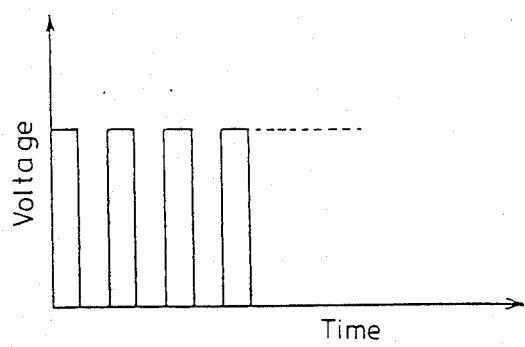
FIGS. 13(A) and 13(B) are graphs of waveforms of alternating voltages.
Figure 13B:
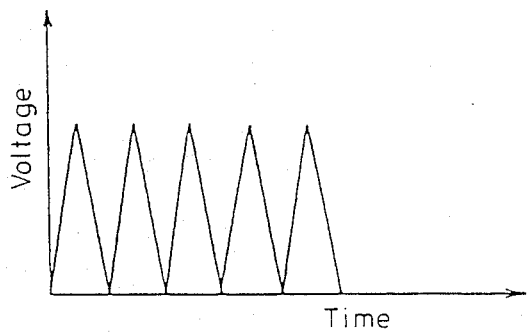

FIG. 13(A) illustrates rectangular waves which are applied intermittently, and FIG. 13(B) illustrates triangular waves which are applied continuously.

Figure 15:
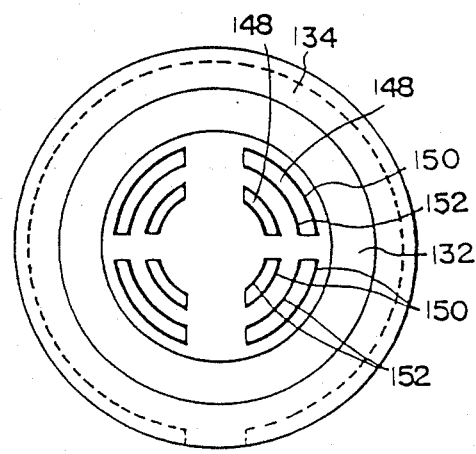
FIG. 15 is a plan view of the partition wall of the tenth embodiment.
Figure 14:
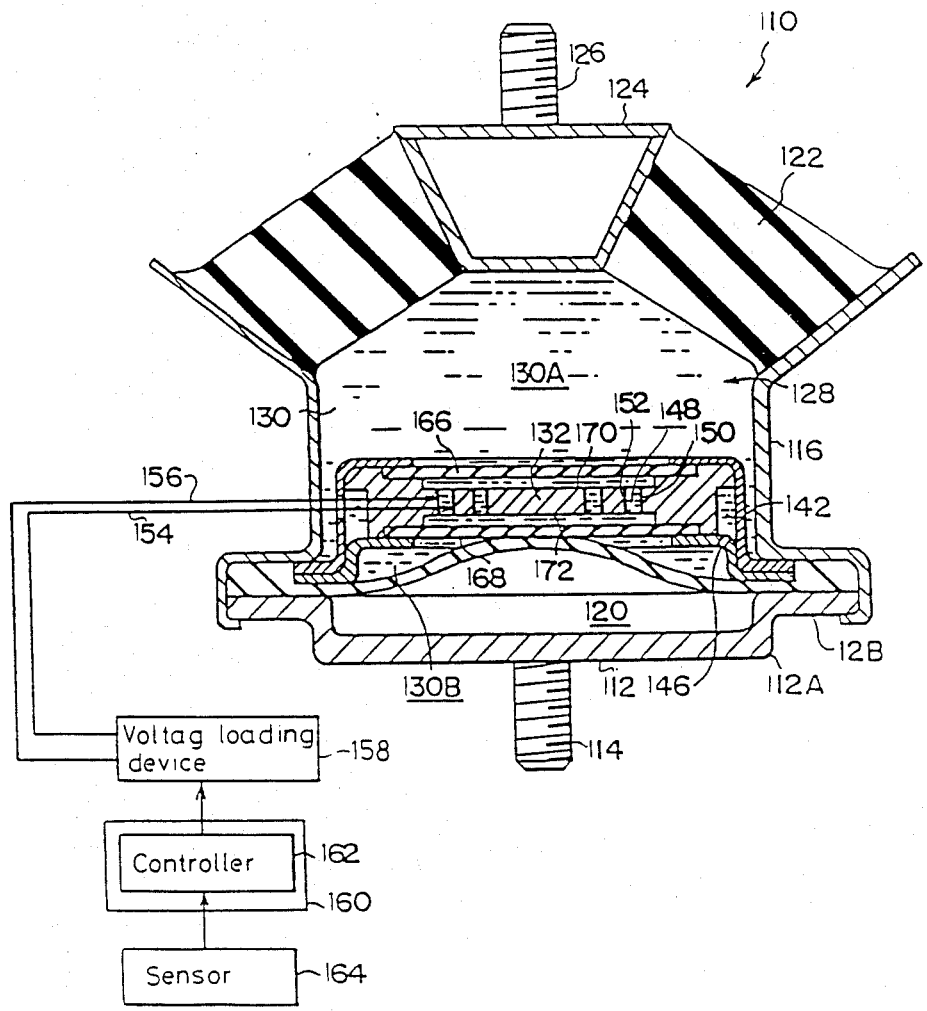
FIG. 14 is a vertical sectional view of the apparatus, showing a tenth embodiment of the present invention.

FIGS. 14 and 15 show a tenth embodiment of the present invention. The anti-vibration apparatus in this embodiment includes flexible membranes 166 and 168 made of, for example, rubber. The flexible membranes 166 and 168 are fixedly disposed on top of and at the bottom of the partition wall 132, respectively, in such a manner that the peripheries thereof are pressed against the partition wall 132 by the upper support plate 134 and the lower support plate 136. The flexible membranes 166 and 168 are adapted to separate the fluid contained in the second passageways 148 from the liquid 130. Therefore, the electrorheologic fluid is used only for the fluid to be contained in the second passageways 148, and the liquid in the liquid chamber 128 may be water or an oil.

To ensure that the flexible membranes 166 and 168 are readily vibrated when the high frequency vibrations are generated, the upper and lower surfaces of the partition wall 132 are provided with recesses 170 and 172 which are located in such a manner as to correspond to the centers of the flexible membranes 166 and 168. The recesses 170 and 172 preferably form liquid chambers for the electrorheologic fluid.

The anti-vibration apparatus of this embodiment also includes a large number of second passageways 148, as shown in FIG. 15. Each of the second passageways 148 incorporates the electrodes 150 and 152 which are connected to the control device in the same manner as in the ninth embodiment.

What is claimed is:

1. An anti-vibration apparatus comprising:
   an expandable liquid chamber interposed between a vibration generating section and a vibration receiving section, said liquid chamber being partially formed by an electric main body containing electrorheologic fluid;
   a partitioning portion partitioning said liquid chamber into a plurality of small liquid chambers;
   an elongated long orifice opening into said small liquid chambers and communicating with said small liquid chambers thereby allowing flow of said electrorheologic fluid; and
   electrode means disposed within said elongated orifice to directly contact said electrorheologic fluid for varying the viscosity of said electrorheologic fluid within said elongated orifice, the viscosity of said electrorheologic fluid being varied in proportion to the strength of an electric field of said electrode means to thereby absorb a wide range of engine vibrations when a current is passed through said electrode means.

2. An anti-vibration apparatus according to claim 1, wherein said elongated orifice is provided in said partitioning portion.

3. An anti-vibration apparatus according to claim 2, wherein said elongated orifice comprises a passage having a substantially curved configuration.

4. An anti-vibration apparatus according to claim 3, wherein said partitioning portion comprises a partition wall with a protruding portion formed at a substantially central portion.

5. An anti vibration apparatus according to claim 4, wherein said passage is formed along the side wall of said protruding portion.

6. An anti-vibration apparatus according to claim 5, wherein said electrode means comprises a pair of electrode plates disposed along said passage in such a manner that they face each other.

7. An anti-vibration apparatus according to claim 6, wherein a top portion of said protruding portion has an opening, within which a movable plate is mounted in such a manner that it can be minutely vibrated in the vertical direction.

8. An anti-vibration apparatus according to claim 6, wherein a top portion of said protruding portion has an opening, within which a plate with a plurality of small through-holes formed therein is mounted between elastic membranes in such a manner that it can be minutely vibrated.

9. An anti-vibration apparatus according to claim 1, wherein the number of said plurality of small liquid chambers is two, and one of said small liquid chambers accommodates a separating plate for dividing said one of said small liquid chambers into two parts, a substantially central portion of said separating plate having an opening.

10. An anti-vibration apparatus according to claim 6, wherein said protruding portion accommodates at least a pair of coaxial electrode plates, and a top portion of said protruding portion has an opening.

11. An anti-vibration apparatus according to claim 1, further including: a first mounting portion to be fixed to said vibration generating section, a second mounting portion to be fixed to said vibration receiving section, and an elastic body disposed between said liquid chamber and either of said first and second mounting portions.

12. An anti-vibration apparatus according to claim 1, further including: a first mounting portion to be fixed to said vibration generating section, and a second mounting portion to be fixed to said vibration receiving section, said first mounting portion passing through said liquid chamber.

13. An anti-vibration apparatus comprising:
a substantially column-shaped liquid chamber partially formed by an elastic main body, said liquid chamber being made to be expandable by the expansion of said elastic main body;
electrorheologic fluid contained in said liquid chamber and having a viscosity which changes when a current is passed therethrough;
a partition wall portion disposed within said liquid chamber substantially perpendicular to the axis of said liquid chamber, said partition wall portion partitioning said liquid chamber into two small liquid chambers;
an elongated long orifice provided in said partition wall portion and formed into a substantially curved configuration about the axis of said liquid chamber, said elongated orifice opening into said small liquid chambers, and communicating with said small liquid chambers thereby allowing flow of said electrorheologic fluid; and
a pair of electrode plates disposed within said elongated orifice and along the wall portion of said elongated orifice to directly contact said electrorheologic fluid in such a manner that they face each other, for varying the viscosity of said electrorheologic fluid within said elongated orifice, the viscosity of said electrorheologic fluid being varied in proportion to the strength of an electric field of said electrode plates to thereby absorb a wide range of engine vibrations when a current is passed through said electrode plates.

14. An anti-vibration apparatus according to claim 13, wherein said partition wall portion comprises a protruding portion formed at a substantially central portion.

15. An anti-vibration apparatus according to claim 14, wherein a top portion of said protruding portion has an opening which communicates said two small liquid chambers, and within which a movable plate is mounted in such a manner that it can be minutely vibrated in the vertical direction.

16. An anti-vibration apparatus according to claim 14, wherein a top portion of said protruding portion has an opening which communicates said two small liquid chambers, and within which a plate having a plurality of small through-holes is mounted between elastic membranes in such a manner that it can be minutely vibrated.

17. An anti-vibration apparatus according to claim 13, wherein one of said small liquid chambers accommodates a separating plate which separates said one of said small liquid chambers into two parts, the substantially central portion of said separating plate having an opening. into two parts, a substantially central portion of said separating plate having an opening.

18. An anti-vibration apparatus according to claim 13, wherein said protruding portion accommodates at least a pair of coaxial electrode plates, and a top portion of said protruding portion has an opening which communicates said small liquid chambers.

19. An anti-vibration apparatus according to claim 13, further including: a first mounting portion to be fixed to said vibration generating section, a second mounting portion to be fixed to said vibration receiving section, and an elastic body disposed between said liquid chamber and either of said first and second mounting portions.

20. An anti-vibration apparatus according to claim 13, further including: a first mounting portion to be fixed to said vibration generating section, and a second mounting portion to be fixed to said vibration receiving section, said first mounting portion passing through said liquid chamber.

* * * * *